(12) United States Patent
Ehlers

(10) Patent No.: US 6,425,725 B1
(45) Date of Patent: Jul. 30, 2002

(54) BULK HANDLING APPARATUS

(76) Inventor: Robert A. Ehlers, R.R. 1, Box 92, Elbow Lake, MN (US) 56531

( * ) Notice: Subject to any disclaimer, the term of this patent is extended or adjusted under 35 U.S.C. 154(b) by 0 days.

(21) Appl. No.: 09/429,336

(22) Filed: Oct. 28, 1999

(51) Int. Cl.$^7$ ................................................ B60P 1/40
(52) U.S. Cl. ...................... 414/505; 414/519; 414/523; 414/526
(58) Field of Search ................................ 414/489, 501, 414/502, 505, 519, 520, 523, 526

(56) References Cited

U.S. PATENT DOCUMENTS

| | | | |
|---|---|---|---|
| 2,573,193 A | * 10/1951 | Goldsberry | 414/520 |
| 2,765,936 A | * 10/1956 | Phillips | 414/526 |
| 4,312,621 A | * 1/1982 | Quanbeck et al. | 414/523 |
| 4,571,143 A | * 2/1986 | Hellerich | 414/523 |
| 5,009,254 A | * 4/1991 | Bruner | 414/526 |
| 5,257,893 A | * 11/1993 | Sevits | 414/526 |
| 5,465,829 A | * 11/1995 | Kruse | 414/526 |
| 5,484,249 A | * 1/1996 | Klatt | 414/526 |
| 5,520,495 A | * 5/1996 | Sukup | 414/523 |
| 5,529,455 A | * 6/1996 | Kaster et al. | 414/526 |
| 5,718,555 A | * 2/1998 | Swalheim | 414/526 |
| 5,718,556 A | * 2/1998 | Forsyth | 414/523 |
| 5,785,481 A | * 7/1998 | Ockels | 414/526 |
| 6,092,974 A | * 7/2000 | Roth | 414/526 |
| 6,120,233 A | * 9/2000 | Adam | 414/526 |

FOREIGN PATENT DOCUMENTS

SU 1502414 * 8/1989 ................. 414/501

* cited by examiner

Primary Examiner—James W. Keenan
(74) Attorney, Agent, or Firm—Robert E. Kleve

(57) ABSTRACT

The invention is a bulk handing apparatus attachable to the flat bed of a truck having a flat bed tiltable on the frame of the truck rearward at an angle. The apparatus has a rectangular elongated frame having side frame members spaced from one another to receive seed containers with projecting ledges the bottom of the containers. The side frame members have inward flanges for engagement over the projecting ledges of seed containers to lock the containers between the side frames and is adapted to receive a plurality of seed containers between the side frame members.. The apparatus has front flanges to engage the front container and hold it between the side flanges and a rear flange to hold the rear container in place and an slidable opening in the rear flange and a guideway beneath the containers and between the side frame member to enable an augering apparatus to be mounted to the rear flange and the containers opened at their bottoms to enable to seed to gravitate down into the guideway and the flat bed and apparatus tilted at an angle to rear to enable the seed to gravitate rearward along the guideway and out the opening in the rear flange to the auger for the auger to auger the seed into seed drills.

4 Claims, 4 Drawing Sheets

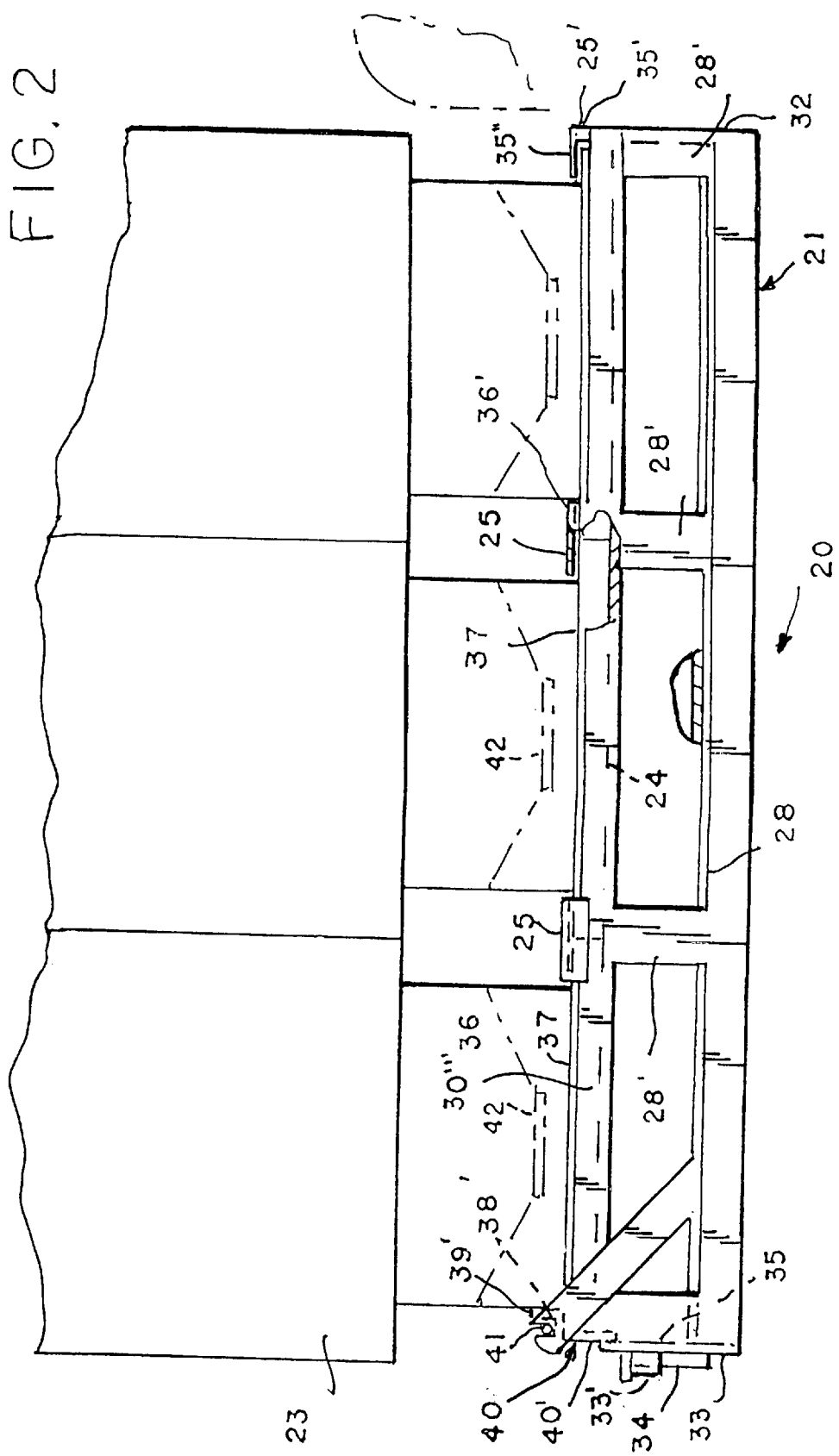

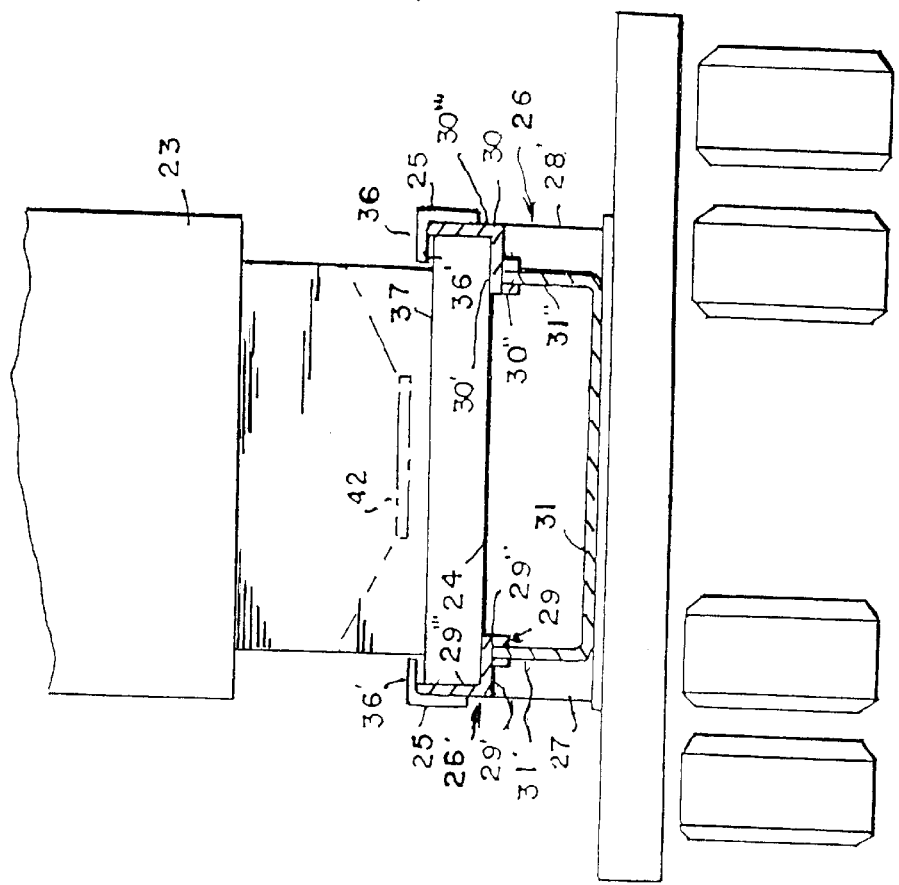

BULK HANDLING APPARATUS

This invention relates to bulk handling apparatus more particularly the invention relates of seed containers for bulk transportation of the handlers and for the emptying of the containers into seed drills and the like.

It is an object of the invention to provide a novel apparatus for emptying bulk seed containers into seed dills and the like.

It is a further object of the invention to provide a novel apparatus for mounting to the flat bed of a truck having an apparatus for Hag the flat bed of the truck m which the apparatus act to lock the containers on the flat bed for transporting the containers to the seed drills in the field and to tilt the containers on the flat bed with empty guideway means on the apparatus for guiding th seed in the containers into a receptacle on the rear of the apparatus in which the receptacle has augering means to auger the emptied seed into the seed drill.

Further objects and advantages of the invention will become apparent as the description proceeds and when taken in conjunction with the accompanying drawings wherein:

FIG. 1 is a side elevational view of of the seed handling apparatus shown mounted on the flat bed of a truck having a tiltable flat bed with seed containers shown mounted onto the handling apparatus in phantom lines and with the flat bed, handling apparatus and seed containers shown tilted at an angle in phantom lies to show their position when emptying the containers into the apparatus and out the rear end of the apparatus into a receiving augering apparatus for augering the seed up into the seed drill.

FIG. 2 is an enlarged side elevational view of the handling apparatus with portions cutaway to reveal the interior construction.

FIG. 5 is a cross sectional view taken along line 5–5 of FIG. 1

FIG. 6 is a perspective view of the seed container frame illustrating the end of the frame.

BRIEF DESCRIPTION OF PREFERRED EMBODIMENTS

Briefly stated, the invention comprises a bulk handling apparatus for mounting to the flat bed of a tuck having a tiltable bed. The apparatus has a frame container holding apparatus for holding three bulk seed containers in a row on the flat bed of the truck with a seed guideway mounted in the bottom of the apparatus beneath the bulk containers, when the containers are mounted in the holding apparatus, for guiding seed emptied from the containers toward the rear of the apparatus, when the apparatus, bulk containers, and flat bed of the truck are tilted at an angle rearward to guide the seed emptied by gravity from the containers to an augering means which may be mounted at the rear of the apparatus which may auger the guided seed or grain into a seed drill.

Figure 1:
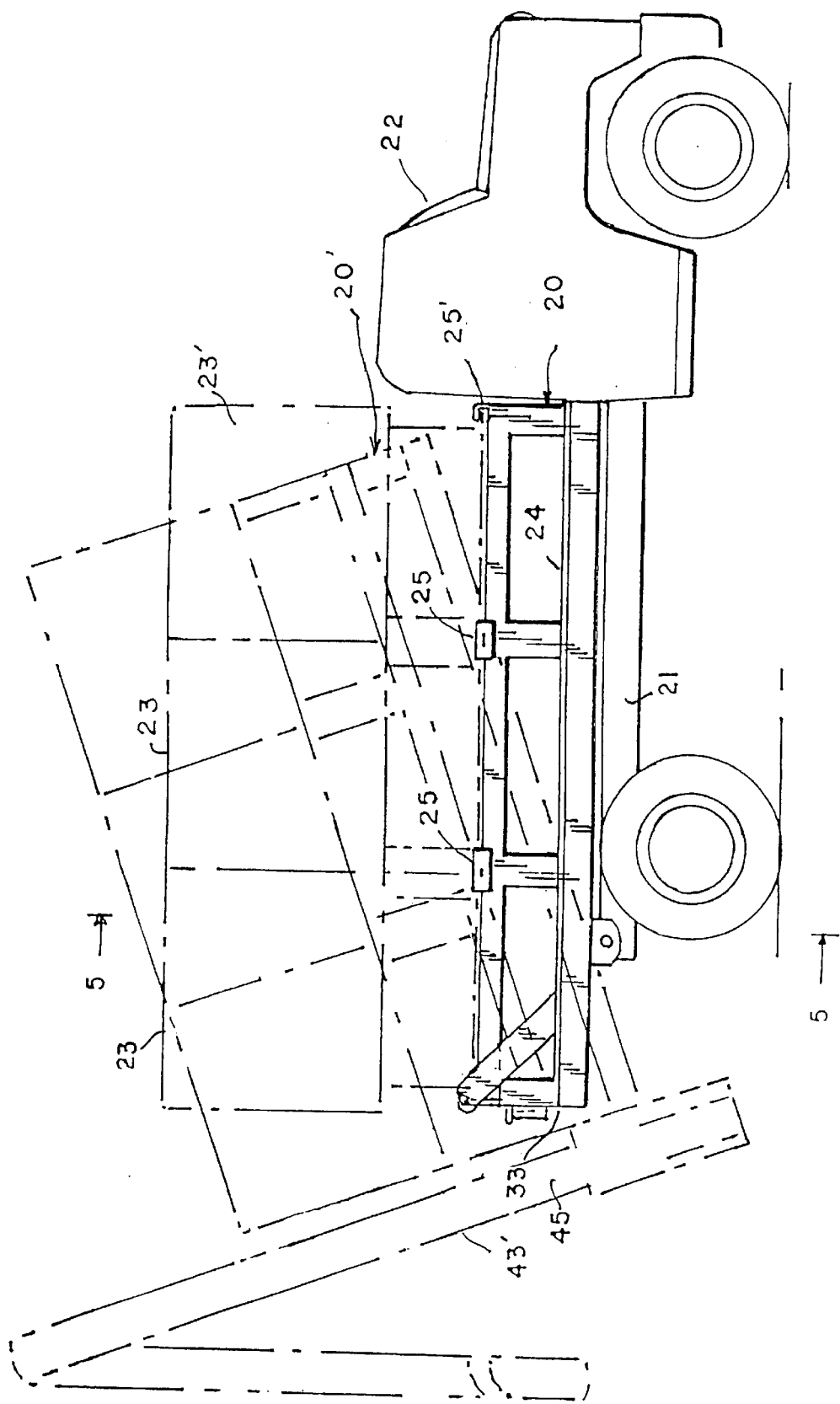
Figure 4:
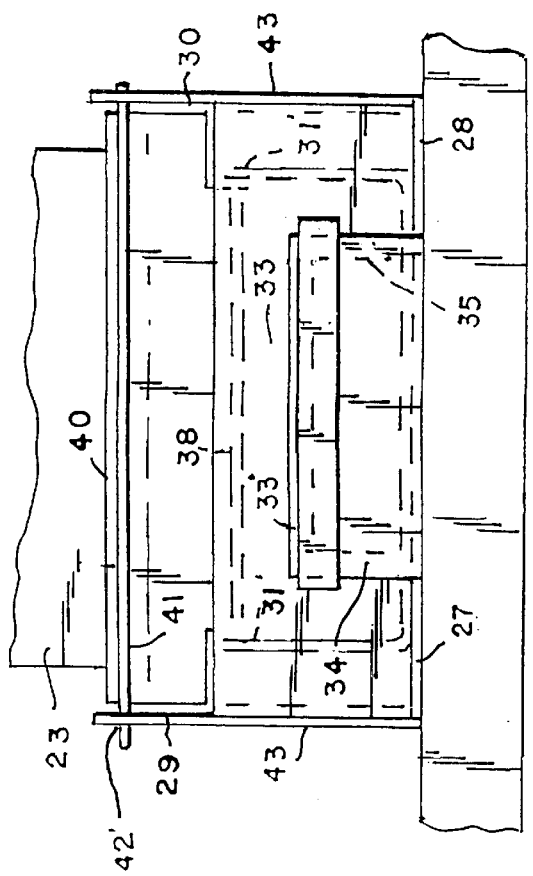
FIG. 4 is an enlarged end view of the handling apparatus illustration the mounting of the end plate for holding the seed containers on the frame.

Referring more particularly to the drawings, in FIG. 1, the bulk seed container handling apparatus 20 is illustrated mounted to a flat bed 21 of a truck 22. Three conventional bulk seed containers 23, 23' and 23" are detachably mounted at their bottoms 24 to the top of the handling apparatus 20 and are locked in place by L shaped flanges 25 fixed to the side frames 26 and 26', respectively, of the apparatus.

The apparatus 20 is an elongated frame having a pair of elongated horizontal plates 27 and 28 at the bottom of the apparatus 20 which are fixed to the flat bed 21 of the tuck. The bottom plates 27 and 28 are spaced laterally parallel beside one another, with four posts 27' fixed to and spaced along plate 27 and four similar upright posts 28' fixed to and spaced along plate 28. An elongated L shaped upper plate 29 has its bottom flange 29' fixed to and extending horizontal along the tops of the posts 27. A similar elongated L shaped plate 30, spaced laterally beside plate 29 has its bottom flange 30' above and fixed to the tops of upright posts 28' and extending along plate 28. A plastic U shaped channel 31 is positioned between the side frames 26 and 26' of the apparatus and extends along the length of the side frames and along the insides of the uptight posts 27' and 28'. A pair of downward flanges 29" are fixed to the bottom of bottom flange 29' of L shaped plate 29 and extend downward along each side of the inner upper edge 31' of the U of channel 31 and another pair of downward flanges 30" are fixed to the bottom of bottom flange 30' of the L shaped plate 30 and extend along each side of the other inner upper edge 31 " of channel 31 to hold the insides of the ends of the channel 31 upright, as shown m the drawings. The rectangular frame 20 has front and rear end plates 32 and 33 fixed across the front and rear ends of the horizontal plates 27 and 28 and L shaped plates 29 and 30 to form a rectangular elongated enclosure beneath the three containers for receiving grain or seed emptied from the bottoms 24 of the three containers.

The seed containers 23—23" each have projecting shoulders 37.The L shaped plates 29 and 30 of the side frames 26 and 26' each have their short L shaped flanges 25 spaced from one another with their upright flange portions 36 fixed to the upright flange portions 29''' and 30''' of L shaped plates or flanges 29 an 30, respectively and extend upward therefrom. The L shaped flanges 25 have their horizontal flange portions 36' projecting inwardly therefrom over the tops of the horizontally projecting shoulders 37 of the containers, which protecting shoulders are located at the bottoms 24 of the seed containers 23,23' and 23", and act then when the containers are mounted in the apparatus to hold the seed containers in place on the frame 20. One flange 25 on one side holds the front edge of shoulder of container 23 and the rear edge of container 23' down, while the other flange 25 on the same side holds the front edge of the shoulder of container 23' and the rear edge of container 23" down. Similarly, the one flange 24 on the other side of the frame holds the front edge of shoulder of container 23 and the rear edge of the shoulder of container 23' down, while the other flange 25 on the same side holds the front edge of the shoulder of container 23' and the rear edge of the shoulder of container 23" down.

The flanges 25 hold the shoulders of the containers in place on the frame to hold the containers in place on the frame, by preventing lateral side to side movement or upward or downward movement on the apparatus. The front plate 32 has a short L shaped flange 25' with its vertical flange portion 35' fixed to the top of the front plate 32 and has a horizontal portion 35" which extends over the top of the front projecting shoulder of the front seed container 23" at the front end of the frame and holds the front of the front container 23" in place on the frame 20 by projecting over the front portion of the shoulders on the front container. The rear end plate 33 of the frame apparatus 20 has a slidable end gate 34 slidable mounted in a strap 33', to the rear end plate 33. The strap is fixed to the rear plate 33 and acts to guide the gate up and down parallel along the rear plate 33. The gate 34 of the frame apparatus slides upward and downward in the strap 33' on the rear end plate 33 of the apparats 20 to open and close respectively an opening 35 in the rear end plate 33 of the apparatus.

Cross braces 38 are fixed between the horizontal plates 29 and 30.

The seed containers 23, 23' and 23", when full of seed, will be mounted on the elongated rectangular frame apparatus 20 when the frame is mounted on the flat bed of a truck. This will be accomplished by sliding each of the three containers horizontally over the tops of the cross braces 38 between the spaced horizontal bottom plates 27 and 28, horizontally forward along horizontal bottom flanges 29' and 30' of the frame from the rear of the frame apparatus with the containers sliding forward onto the frame, with projecting shoulders of the containers sliding beneath horizontally below the horizontal flange portions 36' of the spaced L shaped short flanges 25, spaced along the tops of the top side flanges 29 and 30 of the apparatus. The bottoms of the containers will rest on and slide along the horizontal bottom flanges 29' and 30' between the side frames and above the U shaped channel 31.The front shoulder 37' of the front container 23" when fully on the frame 20 will have slide beneath the horizontal flange portion 35" of the front short L shaped flange 25' at the front plate of the frame apparatus..

Once the containers have been fully mounted onto the frame 20 as described, the z shaped locking plate 40, which has a horizontal portion 38' and offset parallel end portions 39' and 40' will have its vertical flange end portion 39 ' slide down in front of the rear end plate 33 and its horizontal portion 38' resting on the top of the rear shoulder 37' of the rear container 23 and it offset top vertical flange end portion 40' resting against the rear upright wall of the rear container 23. Whereupon, a steel rod 41 will be slide through, eyelets 42 in of the tops of the rear diagonal flanges 43 fixed to the L shaped flanges 29 and 30 of side frame members 26 and 26', sliding across the horizontal portion 38' of the locking plate 40 and across the top of the rear shoulder 37 of the rear seed container 23, to thereby lock the rear container 23 to the rear of the frame and thereby lock all three of the containers on the frame or apparatus 20, while on the flat bed of the truck.

Figure 3:
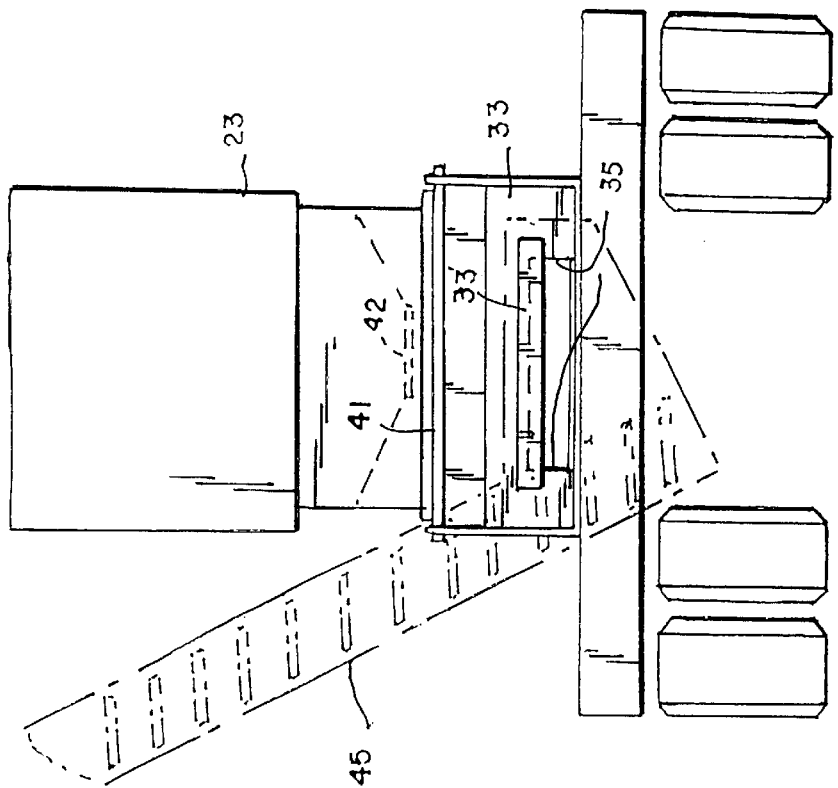
FIG. 3 is a end view of the handling apparatus showing the end of the truck and its flat bed with the seed container shown in phantom lines.

The containers will be transported on the truck to which the frame apparatus 20 is mounted, along roads to fields where seed drills may be located, with the seed containers locked on the frame and the frame locked the flat bed of the truck. The truck will be driven to a location in the field near where the seed drill may be located. A conventional augering apparatus 45, shown in phantom lines in FIGS. 1 and 3 of a conventional construction will be mounted to the rear end plate 33 of the frame apparatus after the seed containers are mounted on the frame apparatus with the frame apparatus mounted on the truck. Once the truck has reached the seed drill or drills needing seed, the conventional emptying plates 42 at the bottom of each seed container 23,23' and 23' will be slid laterally outward from the containers, which opens the bottoms of the seed containers and allows the seed in the containers to empty or gravitate down into the U shaped channel 31 of the frame apparatus. The flat bed 21 of the truck will then be tilted or pivoted rearward at an angle of approximately 20 degrees, as shown in phantom lines 43' in FIG. 1, and the emptying plates of the three containers having been removed laterally from the sides of the containers to open the bottoms of the containers the grain will now can flow or gravitate down from the bottoms of the containers into the channel 31 of the frame apparatus 20 and slide rearward along the U channel 31 to the rear end plate 33. The slidable end gate 34 in the rear end plate of the frame apparatus will be slid upward on the rear end plate to open the opening 35 in the rear end plate 33 at the rear of the apparatus so that seed or grain may flow from the containers by gravity into the channel and along the channel and out the rear opening in the rear plate at the rear of the apparatus. From there the the seed may flow by gravity out the opening into the augering device mounted to the rear of the apparatus. Whereupon, the auger may be pivoted to place its upper end at least near and above the seed containers of the seed drill and the flexible chute mounted to the top of the auger will be placed in the top opening in the seed container of the seed drill and the auger will be then powered to rotate the auger to auger the grain received in the receptacle surrounding the bottom of the auger from the opening in the rear plate of the frame apparatus upward into along the auger to the top of the auger where it will gravitate downward along the flexible chute of the auger into the seed containers of the seed drill for replenishing the seed in the seed drill.

The containers 23, 23' and 23" have their projecting shoulders 37 along its sides and front and rear of the bottoms of the container to allow, on their sides for the L shaped flanges 25 to overhang the onto the tops of the shoulders from beside the containers to hold the containers in the apparatus while allowing the containers to slide rearward and forward beneath the flanges 25.

At the front end of the apparatus, front L shaped flange 25', which over hangs the front shoulder of the front container 23' holds the front of the front containers in place while the side L shaped flanges, hold the sides of the shoulders of the containers in place, and the locking plate 40 at the rear of the apparatus overhanges the rear shoulder 37 of the rear container 23 to hold the rear container in place. The shoulders at the bottoms of the containers extend about the entire perimeter of each container and act when mounted to the frame apparatus to seal or close the frame apparatus from the top so that once seed is released from the containers downward from the container opening into the interior of the frame apparatus the frame apparatus entirely encloses the seed resting in the channel at the bottom of the frame apparatus from sealing the sides from the lateral sides, the top, the bottom, front and rear so that the only release for the seed is out through the rear opening in the rear plate of the frame apparatus.

Though the invention is illustrated mounted to a tiltable bed of a truck, the invention may also be mounted to any trailer or other vehicle having a tiltable bed for the invention to be mounted on. Also, the frame invention may be made longer where longer tiltable beds are being used so that more than three containers may be mounted on the frame.

Thus it will be obvious that a novel seed handling apparatus has been provided enabling seed in bulk seed containers to be easily and rapidly emptied from the seed containers into the containers on the seed drill.

It will be obvious that various changes and departures may be made to the invention without departing from the spirit and scope thereof, and accordingly it is not intended that the invention be limited to that specifically described in the specification, or as illustrated in the drawings, but only as set forth in the appended claims wherein:

What is claimed is:

1. A seed handling apparatus for mounting to a vehicle having a tiltable bed tiltable from horizontal to an angle comprising a frame adapted to be attached horizontally onto said bed of said vehicle for holding seed containers on the bed of said vehicle, said seed containers being adapted to carry seed and having bottoms with openings therein for emptying seed from said containers with means to open and close said container openings;

said frame having opposing outer side members and a rear member with said members forming a center opening, one of said members having an openable closure that may be opened to receive said containers within the confines of the frame with said containing projecting upward through the center opening, means on said frame members to secure said frame members to the bed of the vehicle, means on some of said frame members to hold said containers to the bed and frame when said containers are mounted on said bed within said frame, guideway means in said frame below the bottoms of said containers when mounted within th frame to the bed to receive seed from the openings in the bottoms of the containers, said rear member of said frame having an opening means adjacent guideway means, means on said frame to receive an auger having remote ends with one of said ends adjacent the opening means in the rear member of the frame; whereby the containers, upon being mounted to the bed of the vehicle within the frame may be moved by the vehicle to a seed drill, and the bed of the vehicle tilted rearward at an angle to horizontal to tilt the frame, the container, and the guideway means rearward at an angle from horizontal toward the opening means in the rear member, so that the openings in the bottoms of the containers, being opened, will cause seed from the containers to flow by gravity out the bottoms of the containers into and along the guideway means and through the opening means in the rear member of the frame to the one end of the auger, and the auger may be operated to auger seed received at the one end of the auger to the other end of the auger with the other end of the auger positioned at the seed drill to deliver the seed to the seed drill.

2. A seed handling apparatus for mounting to a flat bed of a truck having the bed tiltable from horizontal to an angle relative to the truck comprising a rectangular frame adapted to be mounted horizontally on said bed of said truck to support a plurality of seed containers on said flat bed of said truck with said containers adapted to contain seed;

said containers having bottoms with openings in the bottoms and means to open and close the container openings for emptying the seed from the containers with said containers having lower projecting portions;

said frame having a center opening with peripheral rear and peripheral opposing side portions peripheral to the opening, said containers having said lower projecting opposing side portions adapted to project beneath the peripheral opposing side portions of said frame when said containers are mounted to the frame to engage and hold the containers to the frame with the containers having upper portions projecting upward through the center opening of the frame;

said peripheral rear portion of the frame having a movable end plate movable across the rear end of the frame to close the frame and hold the containers on the frame and movable away from said frame to open said frame to allow said containers to be slide into and off of a center area of the frame through said opening in said rear peripheral portion of said frame; said frame having an elongated guideway means below the container openings and the frame opening and above the flat bed of the truck and having one end extending toward the rear frame portion; and said rear frame portion also having a closable opening in line with said one end of said guideway; whereby, the container's upon being mounted on the frame and the frame mounted on the flat bed of the truck, may be transported by the truck to a seed drill in the field for the seed drill with seed from the containers; and the opening in the rear frame portion may be opened, so that the bed, upon being tilted upward will tilt the frame and containers and guideway upward at an angle toward the opening in the rear frame portion so that the openings in the bottoms of the containers, being opened, will cause seed from the containers to flow by gravity out the bottoms of the containers into and along the guideway and through the opening in the rear frame portion whereupon, an auger may be placed adjacent the opening in the rear frame portion auger the seed flowing through the opening along the auger drill to the seed to replenish seed in the seed drill.

3. Granular material handling apparatus for mounting to a tiltable bed of a vehicle in which is bed is tiltable from horizontal to an angle relative to said vehicle, and in which said apparatus acts to support and empty granular material containers on said bed of said vehicle with the containers having tops and bottoms with the bottoms having means to open and close the bottoms, said apparatus comprising a elongated rectangular frame, said frame having a pair of opposing side portions each having portions adapted to be mounted to the bed of vehicle and a rear end frame portion with a center opening in the frame, said rear end frame portion having an opening with means to close said opening to horizontally receive the containers along their bottoms, rear to front one at a time, horizontally through said rear opening through the rear end frame portion between the opposing side portions of the frame and onto the bed to mount said containers to the frame and bed of the vehicle with said tops of said containers projecting upward through said center opening in the frame, means along the opposing side of the frame to hold the containers to the frame, guideway means on the frame beneath the bottoms of the containers when the containers are mounted on the frame, said guideway means acting to receive granular material emptied through the bottom openings in the containers, said rear end frame portion of said frame having a material opening means to allow granular material from the containers onto the guideway means to travel along the guideway means through the material opening means, said rear end frame portion also having means for mounting an auger onto the rear end frame portion in the path of the growth material traveling out the rear opening whereby material traveling out said material opening means may be augered away from the apparats 4. A granular material handling apparatus according to claim 3 wherein said opposing side portions of said frame each have a generally L shaped cross section with one leg of the L shaped cross section extending downward and directly secured to the bed of the vehicle and the other leg of the L shaped cross section extending horizontally inward toward one another and adapted to extend over the tops of the projecting portions of the container to hold the containers to the bed of the vehicle while enabling the containers to be slid from rear to front onto the bed beneath the horizontal leg of the opposing side portions.

\* \* \* \* \*